March 25, 1941. E. R. JAGENBURG 2,236,176

FRUIT AND VEGETABLE CUTTING MACHINE

Filed June 6, 1939 6 Sheets-Sheet 1

INVENTOR
E. R. Jagenburg,
BY
M. C. Lyddane
ATTORNEY

March 25, 1941.  E. R. JAGENBURG  2,236,176
FRUIT AND VEGETABLE CUTTING MACHINE
Filed June 6, 1939  6 Sheets-Sheet 2

INVENTOR
E. R. Jagenburg,
BY M. C. Lyddane
ATTORNEY

March 25, 1941.　　　E. R. JAGENBURG　　　2,236,176
FRUIT AND VEGETABLE CUTTING MACHINE
Filed June 6, 1939　　　6 Sheets-Sheet 3

INVENTOR
E. R. Jagenburg,
BY
ATTORNEY

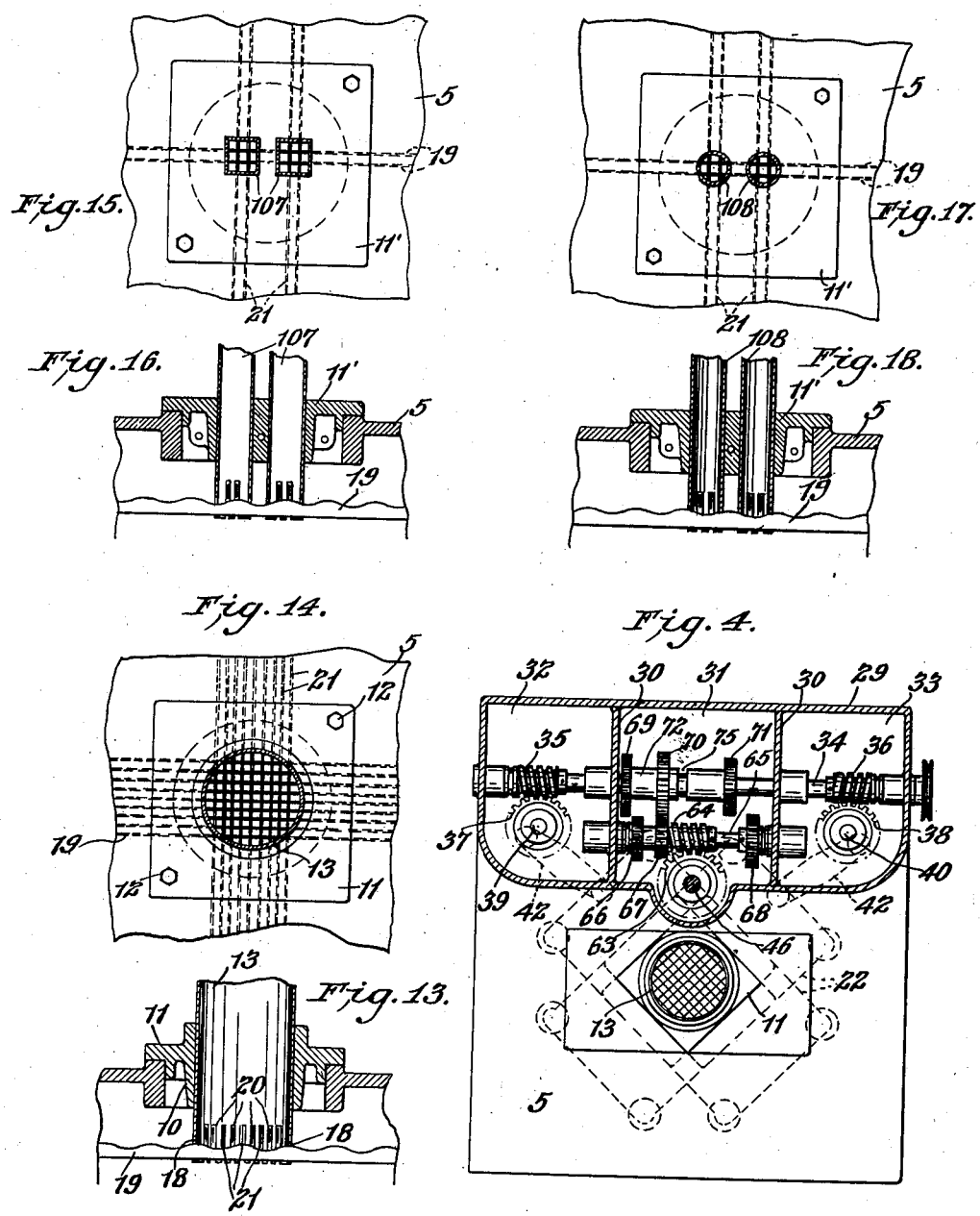

March 25, 1941.  E. R. JAGENBURG  2,236,176
FRUIT AND VEGETABLE CUTTING MACHINE
Filed June 6, 1939  6 Sheets-Sheet 5
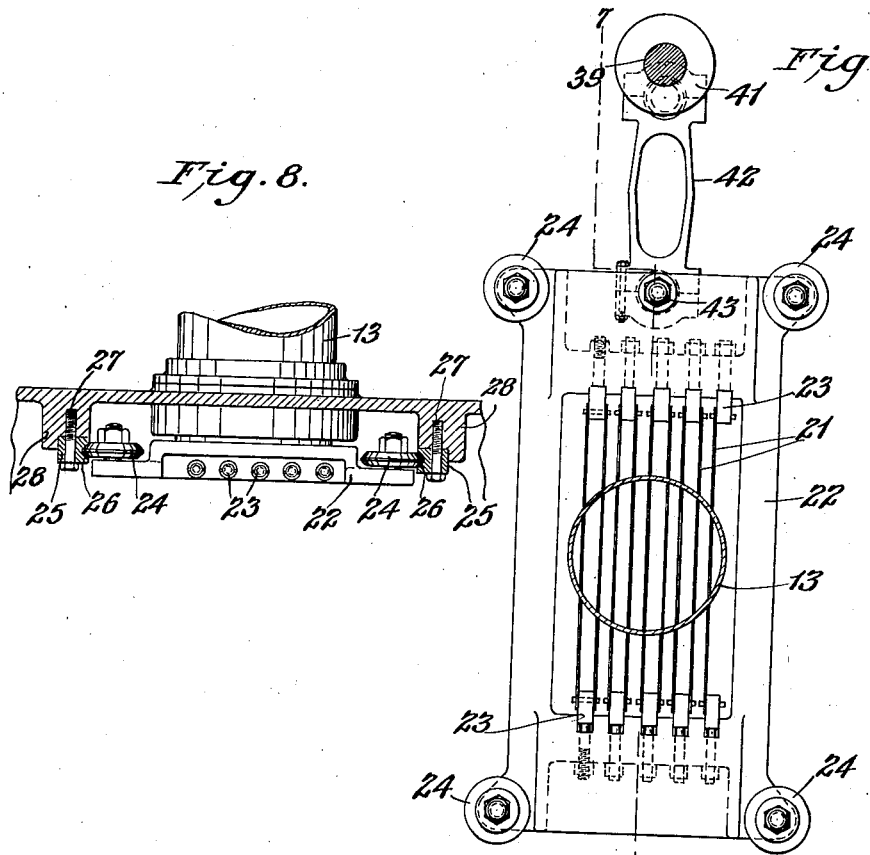
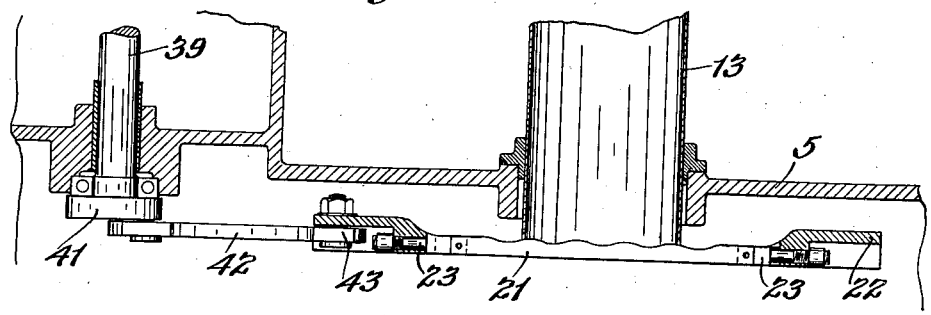
INVENTOR
E. R. Jagenburg,
BY
ATTORNEY March 25, 1941.  E. R. JAGENBURG  2,236,176
FRUIT AND VEGETABLE CUTTING MACHINE
Filed June 6, 1939  6 Sheets-Sheet 6

INVENTOR
E. R. Jagenburg,
BY
ATTORNEY

Patented Mar. 25, 1941

2,236,176

UNITED STATES PATENT OFFICE 2,236,176

FRUIT AND VEGETABLE CUTTING MACHINE

Eugene Robert Jagenburg, Douglaston, Long Island, N. Y.

Application June 6, 1939, Serial No. 277,577

4 Claims. (Cl. 146—78)

This invention relates to fruit and vegetable cutting machines and has for its general object and purpose to provide certain important improvements in a machine of the type disclosed in Patent No. 1,418,443 issued June 6, 1922, whereby the operating efficiency and general utility of such machines is materially increased.

One of the important objects of the present invention is to provide a machine for dicing whole vegetables or fruits and the operation of which may be so regulated and controlled as to produce individual fruit particles of a desired, predetermined size.

Another object is to provide simple and efficiently operating means for progressively feeding the whole fruit or vegetable to two series of reciprocating cutting knives disposed at right angles to each other, to cut the fruit or vegetable into strips of a predetermined cross-sectional area.

Another object of the invention resides in the provision of cutting means rotatably mounted beneath the knife carrying frames for cutting the strips into cube or dice shaped form, together with variable speed operating means therefor and which also controls the operating speed of said feeding means.

An additional object of the invention is to provide other means for independently controlling the operating speed of said feeding means with respect to said variable speed operating means for the rotatable cutter.

Another important object of the invention resides in the provision of means whereby the rotatable cutter may be adjusted so as to provide fruit or vegetable cubes of a desired predetermined thickness.

Other desirable practical features of the invention comprise an improved mounting for the reciprocating knife carrying frames, and means whereby provision is made for the interchangeable use of a plurality of feeding cylinders of various shapes and sizes.

With the above and other objects in view the invention consists in the improved fruit and vegetable cutting machine and in the form, construction and relative arrangement of its several parts as will be hereinafter more fully described, illustrated in the accompanying drawings, and subsequently incorporated in the subjoined claims.

In the drawings wherein similar reference characters designate corresponding parts throughout the several views and in which I have disclosed a preferred practical embodiment of my present improvements, Fig. 1 is a perspective view of a machine constructed in accordance with the present invention.

Fig. 4 is a horizontal sectional view on the line 4—4 of Fig. 3.

Fig. 6 is a detail plan view of one of the reciprocating knife carrying frames.

Fig. 7 is a longitudinal section thereof taken substantially on the line 7—7 of Fig. 6.

Fig. 8 is an end elevation illustrating the mounting of said knife carrying frame.

Fig. 13 is a vertical sectional view showing the mounting and construction of the lower end of the magazine with the two series of reciprocating knives.

Fig. 14 is a plan view thereof.

Figs. 15 and 16 are plan and sectional views respectively, showing two smaller feed tubes of rectangular cross-section substituted for the single large diameter feed tube of Fig. 13.

Figs. 17 and 18 are similar plan and sectional views showing two small diameter cylindrical feed tubes which may be interchangeably used with the tubes shown in Figs. 13 and 15.

Referring in detail to the drawings, 5 designates a suitable table top supported by the corner legs or pedestals 6. Beneath the table top 5 a receiving hopper 7 for the cut fruit or vegetable particles is suitably mounted and discharges into the collection receptacle indicated at 8.

Figure 3:
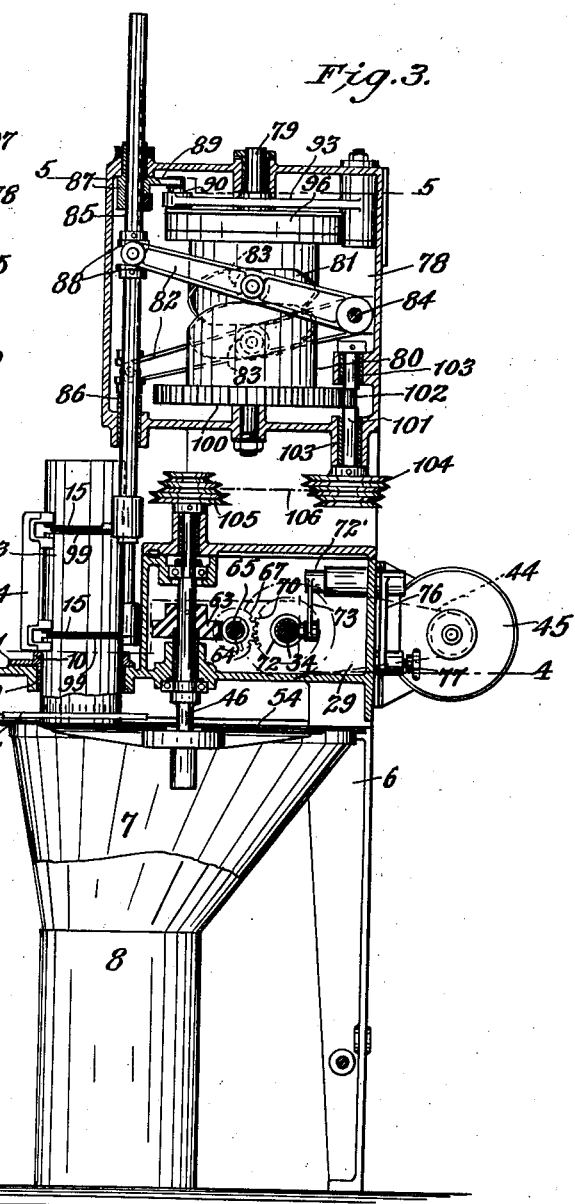
Fig. 3 is a vertical sectional view taken substantially on the line 3—3 of Fig. 2.

At one side of its center the table top 5 is formed with an opening surrounded by the depending flange 9 which receives a bushing 10 having a flange 11 adapted to be detachably secured to the table top by suitable bolts indicated at 12. In this bushing the lower end of the feed tube or magazine 13 is suitably secured. As shown in Fig. 3 of the drawings this feed tube is in three sections connected by a bracket member 14, said sections having vertically spaced apart edges forming the slots indicated at 15 for a purpose to be presently explained. These horizontal slots are connected at their ends by the vertical slots 16 which are closed at the outer side of the magazine wall by the abutting flexible members 17 secured to said wall along the opposite edges of the slots.

The lower end of the tubular magazine 13 is provided in its edge with diametrically opposed slots indicated at 18, suitably spaced apart to receive the horizontally reciprocating knife blades 19. Above these slots 18, the magazine wall is provided with additional diametrically opposed slots 20 to receive a second series of knife blades 21, reciprocating at right angles to the knife blades 19. Each series of knife blades are mounted in a suitable metal frame 22, the individual blades being connected at their opposite ends to adjustable tensioning members 23 carried by said frame. At opposite sides of frame 22 and at each end thereof the rollers or supporting wheels 24 are mounted and equipped with sealed self-lubricating bearings of an approved commercial type. These wheels or rollers have V-shaped or tapered peripheries for rolling contact upon the surfaces of the V-shaped grooves 26 on the guide rails 25, which are rigidly fixed at spaced intervals by bolts 27 to depending ribs or flanges 28 integrally cast with the table top 5. It will be noted, from reference to Figs. 6 and 8 of the drawings, that the frame supporting rollers 24 and their bearings are remotely spaced from the zone or area in which the fruit or vegetable juices issue from the magazine 13 into the hopper 7. Thus the collection of fruit sugars or juices on the roller or wheel bearings, which would soon affect their proper efficient operation, is precluded.

At one side of the cylinder or magazine 13 a housing 29 is provided upon the table 5, the interior of said housing being divided by the transverse walls 30 into a central compartment 31 and end compartments 32 and 33 respectively. A horizontal shaft 34 extends through these compartments and is journalled in suitable bearings provided on the walls thereof. Within each of the end compartments 32 and 33, a worm 35 and 36 respectively, is fixed to the shaft. These worms are in constant mesh with worm gears 37 and 38 respectively, on the upper ends of the vertical shafts 39 and 40. Each of these shafts at its lower end, is provided with a disk 41 to which one end of a link 42 is eccentrically pivoted, the other end of said link being pivotally connected, as at 43, with one end of one of the reciprocating knife frames 22.

Externally of the housing 29, one end of the shaft 34 has a driving connection 44 with the shaft of an electric motor 45 or other suitable source of power.

The shaft 46 extends vertically through the housing chamber 31 and to the lower end thereof, and below the knife carrying frames 22 a rotary cutter is fixed. This rotary cutter comprises a marginally flanged disk 47 having two reversely curved slots 48 therein, extending in opposite directions from points adjacent the axial center of the disk and terminating adjacent to the periphery thereof.

Figure 9:
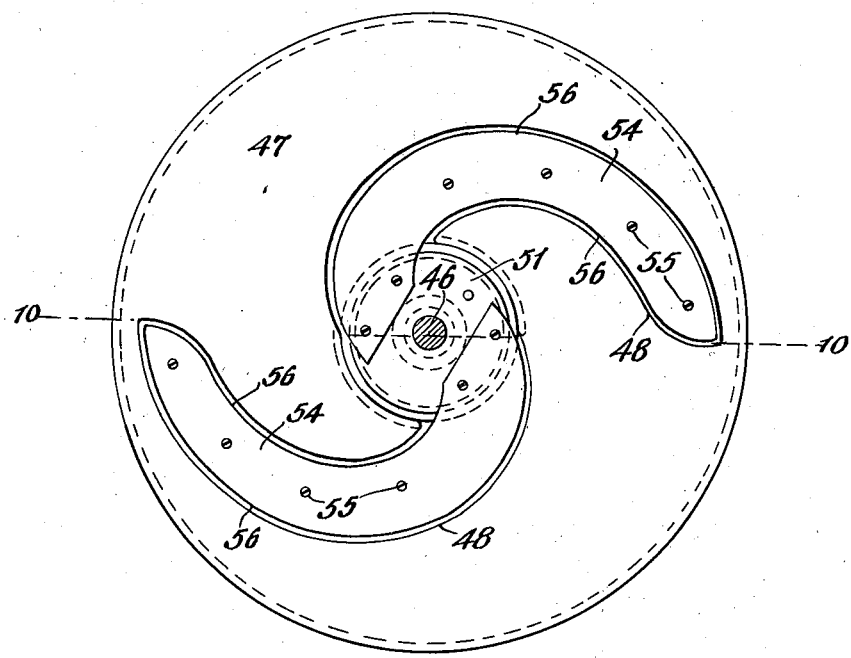
Fig. 9 is a plan view of the rotatable cutting means.

The disk 47 is provided with a central hub portion 49 having a central opening and formed with spaced depending parts 50. Through the central opening of said hub portion, the sleeve 52 of a flanged disk or head 51 is fitted. This head is formed with curved arms 53 centrally disposed relative to the slots 48 in the disk 47. Upon these arms the thin curved knife blades 54 are secured by suitable screws, indicated at 55. As seen in Fig. 9 of the drawings, the cutting edges 56 of these knife blades extend in substantially parallel relation to the opposed edges of the respective slots 48. The knife carrying disk or head 51 is fixed to the shaft 46 by a suitable set screw 57. This head also carries a depending rod or pin 58 which is loosely engaged in a suitable opening provided in the hub portion 49 of disk 47 and prevents relative rotative movement between said disk and the cutting knives.

The lower end of the shaft 46 is provided with a threaded bore 59 receiving the adjusting screw or bolt 60. Between the head of this bolt and the depending parts 50 of the disk hub a washer plate 61 is interposed. It will thus be evident that by turning the bolt 60, the disk 47 may be raised or lowered to vary the vertical distance between the cutting edges of the knives 54 and the edges of the slots 48. A further adjustment may be obtained by providing a series of interchangeable plates 61 of relatively different thicknesses. The disk 47 may be additionally secured in fixed adjusted relation to the knives 54 by means of the set screw 62 on one of the parts 50 which engages the sleeve 52 of the knife carrying head 51.

Within the housing chamber 31 a worm gear 63 is fixed to the shaft 46 and is in constant mesh with a worm 64, fixed to a countershaft 65 mounted at its opposite ends in suitable bearings provided on the housing walls 30. To said countershaft the three gears 66, 67 and 68 respectively, of relatively different diameters, are rigidly secured. A set of gears 69, 70 and 71, of different diameters are carried by the sleeve 72, splined or keyed to the driven shafts 34, and are adapted to mesh with the gears 66, 67 and 68 respectively, or to be disposed in a neutral position with respect to the latter gears.

Any conventional means may be employed for shifting the variable speed transmission gears, and for this purpose I have shown a shaft 72' journalled in a bearing on the rear wall of the housing 29 and having a depending arm 73 on its inner end, provided with a stud 74 engaged in an annular groove 75 formed in the sleeve 72. To the outer end of shaft 72', the operating arm 76 is fixed and carries a spring pressed pin, indicated at 77, adapted to engage any one of a series of recesses or openings in the wall of the housing to releasably retain the gear shifting arm 73 in adjusted position.

Figure 10:
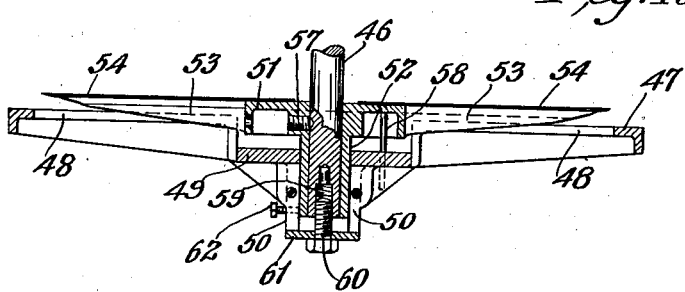
Fig. 10 is a vertical sectional view thereof substantially on the line 10—10 of Fig. 9.

It will be readily seen from the foregoing and with reference to Fig. 4 of the drawings, that as the reciprocating knife carrying frames 22 are operated to cut the fruit or vegetable into strips or rectangular cross-sectional form, the rotary cutting means on Figs. 9 and 10 is simultaneously operated to cut said strips into dice or cube shaped form. Of course the thickness of such cube shaped particles is determined by the distance between the edges of the slots in disk 47 and the cutting edges of the knife blades 54. The rotary cutting means may be operated at variable speeds, relative to the reciprocating movement of the knife frames 22 through the variable gear transmission, driving shaft 34, and countershaft 65, as above described. When sleeve 72 carrying the variable speed gears is shifted to the extreme right hand position, said gears will be in neutral position so that power will not be transmitted to countershaft 65 and the rotary cutting means will not be operated. However, the knife carrying frames 22 being directly geared to the driven shaft 34 will then be independently operated, which is desirable in the cutting of small fruits or vegetables or fruit slices.

Figure 1:
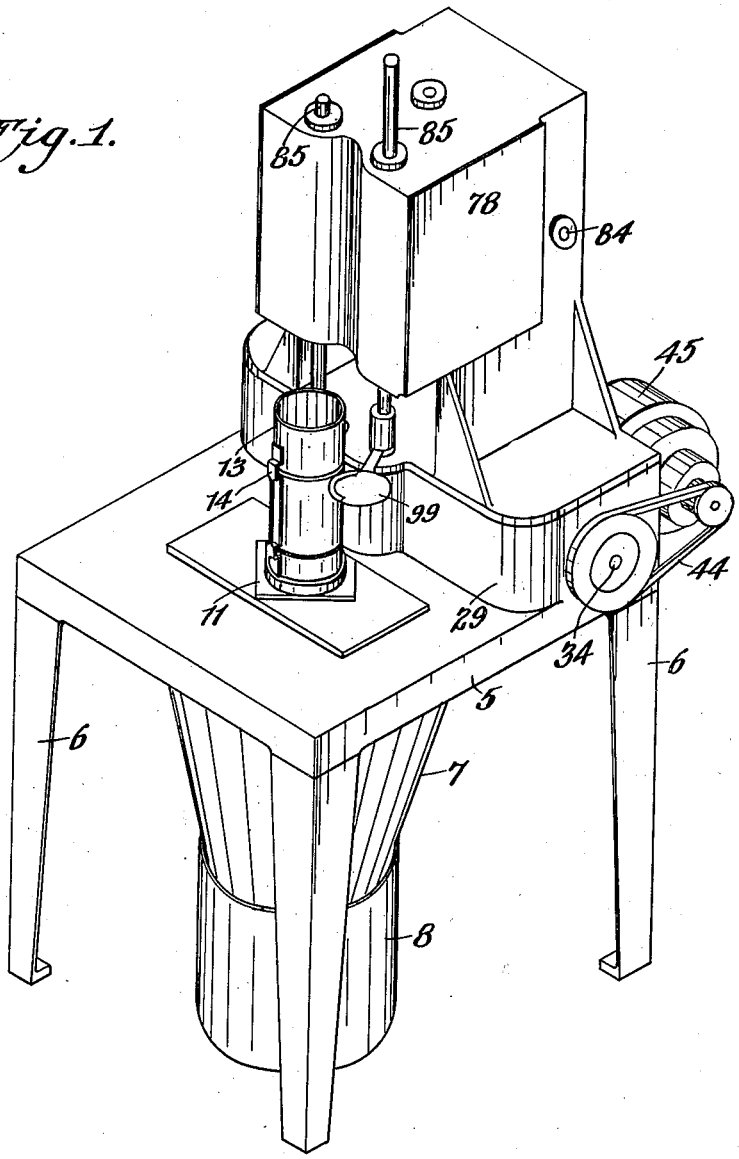
Figure 2:
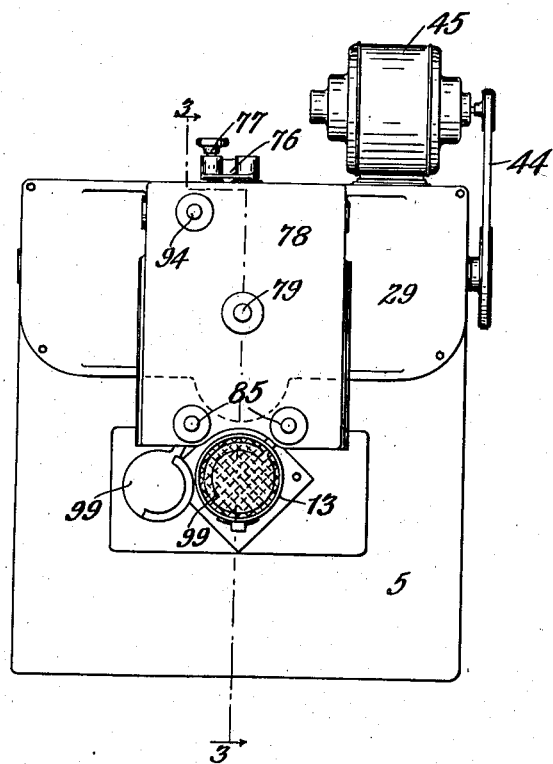
Fig. 2 is a top plan view thereof.
Figure 5:
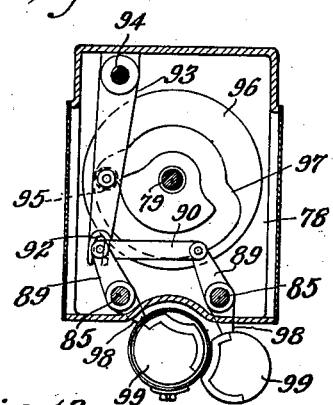
Fig. 5 is a similar sectional view taken substantially on the line 5—5 of Fig. 3.
Figure 12:
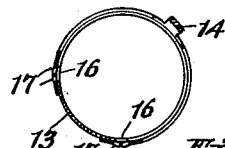
Fig. 12 is a horizontal sectional view of the feed magazine shown in Fig. 11 taken midway between the slots 15.
Figure 11:
Fig. 11 is a fragmentary side elevation of the feed magazine.

However, the present invention is primarily designed for the purpose of cubing or dicing large size fruits such as cored whole pineapple, and I preferably provide an automatic, mechanical feeding means whereby the fruit is forced downwardly, under pressure, through the magazine or cylinder 13 to the cutting knives 21. Referring to Figs. 3 and 5 of the drawings, above the housing 29, I provide a second housing 78 in the upper and lower walls of which the ends of vertical shaft 79 are suitably mounted in fixed relation to said walls. This shaft rotatably supports the cylinder member 80 having a cam track 81. With this cam track, rollers 83 carried by levers 82 disposed at opposite sides of member 80 are engaged. These levers are fulcrumed at one of their ends as at 84 upon the inner side of one wall of housing 78.

A pair of spaced rods 85 are vertically slidable through the guide bushings 86 in the lower wall of the housing 78. Sleeves 87 are rotatably mounted in the top wall of the housing, and the rods 85 are keyed or splined in these sleeves for vertical movement relative thereto. Each of said rods carries the spaced collars 88 with which the other end of one of the levers 82 is connected.

Each sleeve 87 at its lower end has an arm 89, said arms being connected with each other by the link 90, which is provided at one of its ends with a stud or pin slidably engaged in the slot 92 in one end of a lever 93, fulcrumed at its other end within the housing 78 as at 94. This lever, intermediate of its ends, carries a roller 95 engaged in the cam track 97 of a disk 96 on the upper end of the rotatable member 80.

To the lower end of each rod 85, an arm 98 is suitably secured and carries a pusher disk 99 which is adapted to engage the fruit within the cylinder 13 and force the same downwardly therethrough.

To the lower end of the member 80 a gear 100 is suitably secured and is in constant mesh with a pinion 102 on a vertical shaft 101 mounted in suitably spaced bearings 103 on the wall of the housing 78. To the lower end of this shaft, a multiple diameter belt wheel or pulley 104 is secured. A similar belt wheel 105 is also fixed to the upper end of the vertical shaft 46. These wheels are adjustably connected with each other by a suitable driving belt 106. Thus as above explained I provide a variable speed transmission for operating the rotatable cutting means which cuts the fruit strips into cube or dice shaped form, and whereby the operating speed of the feeding means may be correspondingly varied, while in addition, the operation of the feeding means may be controlled and varied independently of the gear transmission through the adjustment of the driving belt 106.

In the operation of the mechanism, the rods 85 are alternately reciprocated by the cam member 80 and when one of these rods is at the limit of its upward movement and the other at the limit of its downward movement, said rods are rotated by the cam actuated lever 93 and the connections 89 and 90 between said lever and the rods, so that the pusher disk 99 on the lower end of the first named rod, is moved inwardly through the upper slot 15 of the feed cylinder or magazine while the disk 99 on the other of said rods is moved outwardly through the lower slot 15.

Thus in the relative reverse movement of said rods 85 the latter feed member 99 will move upwardly exteriorly of the cylinder 13, while the disk 99 on the other of said rods will move downwardly within said cylinder and exert pressure upon the fruit therein to feed the same to the reciprocating knives 22 and the rotary cutting knives 54. As the latter pusher or feed disk 99 approaches the end of its downward movement, additional whole, cored pineapple or other fruit is fed into the upper end of the cylinder 13. In this manner, an automatic positive feed of the fruit to the cutting mechanism is obtained, resulting in an evenly applied pressure and maximum production without maceration or crushing of the cut fruit particles.

When it is not desired to dice the fruit but merely cut the same into strips of uniform cross-sectional form, the rotary cutting mechanism of Figs. 9 and 10 is rendered inoperative by shifting the transmission gears to neutral position and detaching said cutting means from shaft 46. In such case, I may substitute for the single feed cylinder 13, a pair of cylinders 107 or rectangular form as shown in Fig. 15 of the drawings, or of cylindrical form as indicated at 108 in Fig. 17. These cylinders are arranged in suitably spaced apart relation and secured adjacent their lower ends in the attaching plate 11'. Obviously, one or more feeding cylinders of other selected forms might be variously arranged, as might be found most desirable for the particular fruit or vegetable to be cut.

I have herein shown and described a practical mechanical embodiment of my present invention which has given very satisfactory results in use. It will be seen that the rotary cutting mechanism can be easily and quickly adjusted to provide fruit particles in the form of cubes or dice of any predetermined thickness. It will be noted that all of the cutting mechanism is below the surface of the support or table 5 so that the fruit juices will not collect thereon. Also the new mounting and arrangement of the reciprocating knife carrying frames assures their efficient operation, preventing the collection of fruit juices and sugars upon the bearing rollers or the guide rails with which they coact.

While I have herein disclosed a preferred embodiment of my present improvements, it is nevertheless to be understood that in the further development thereof it might be found desirable to resort to certain structural changes therein. Therefore, I reserve the privilege of embodying the essential features of the present disclosure in various alternative structural forms and resorting to such changes in the form, proportion and relative arrangement of the several elements as may fairly be considered to be within the spirit and scope of the invention as claimed.

I claim:

1. In a machine of the character described, means for feeding fruit or the like to a cutting mechanism comprising a stationary fruit receiving magazine, a pusher disk mounted for bodily movement in an arcuate path into and out of coaxial relation with the magazine and also longitudinally thereof and means for reciprocating said pusher disk within the magazine.

2. In a machine of the character described, means for feeding fruit and the like to a cutting mechanism comprising a fruit receiving magazine, a pair of pusher disks mounted for reciprocating movement with respect to said magazine and for rotative movement into and out of coaxial relation therewith, and two cam actuated means operable in timed relation to respectively alternately reciprocate said feed disks and to rotate each disk at opposite ends of its reciprocating movement into and out of coaxial relation with the magazine.

3. In a machine of the character described, means for feeding fruit or the like to a cutting mechanism, comprising a fruit receiving magazine, a pusher disk mounted to reciprocate within and relative to said magazine and for movement into and out of coaxial relation therewith, means for reciprocating said pusher disk, and cam actuated means connected with a part of the last named means for bodily moving said disk at opposite ends of its reciprocating movement in its own plane into and out of coaxial relation with the magazine.

4. In a machine of the character described, means for feeding fruit or the like to a cutting mechanism, comprising a fruit receiving magazine, a pusher disk mounted to reciprocate within and relative to the magazine and for movement into and out of coaxial relation therewith, and two cam actuated means operable in timed relation to reciprocate said disk and to bodily move said disk in its own plane, respectively, at opposite ends of its reciprocating movement into and out of coaxial relation with the magazine.

EUGENE ROBERT JAGENBURG.